(12) United States Patent
Burt et al.

(10) Patent No.: US 7,307,238 B2
(45) Date of Patent: Dec. 11, 2007

(54) DETERMINING QUALITY OF A STICK ELECTRODE

(75) Inventors: Randall M. Burt, Mentor, OH (US);
Jon P. Chiappone, Willoughby, OH (US); Craig B. Dallam, University Heights, OH (US); Robert J. Weaver, Concord, OH (US)

(73) Assignee: Lincoln Global, Inc., City of Industry, CA (US)

( * ) Notice: Subject to any disclaimer, the term of this patent is extended or adjusted under 35 U.S.C. 154(b) by 159 days.

(21) Appl. No.: 11/357,863

(22) Filed: Feb. 21, 2006

(65) Prior Publication Data

US 2007/0193992 A1 Aug. 23, 2007

(51) Int. Cl.
*B23K 9/095* (2006.01)
(52) U.S. Cl. .............................. 219/130.01; 219/137 R; 228/103
(58) Field of Classification Search ........... 219/130.01, 219/137 PS; 228/103
See application file for complete search history.

(56) References Cited

U.S. PATENT DOCUMENTS 2,294,650 A * 9/1942 Bechtle ................. 219/137 R
6,703,585 B2 * 3/2004 Suzuki .................. 219/130.01

* cited by examiner

Primary Examiner—Clifford C. Shaw
(74) Attorney, Agent, or Firm—Fay Sharpe LLP

(57) ABSTRACT

A method of measuring the quality of a stick electrode used in forming the root bead of a pipe joint, which electrode has a wire diameter, a length substantially greater than 12 inches and an upper exposed rod head. The method comprises: preparing a standardized workpiece including two spaced plates with a groove between the plates having a set profile including a lower gap duplicating the root gap of the pipe joint and mounting the standardized workpiece on an incline with the groove facing upwardly where the incline is at a fixed known angle. Then a stick electrode of the type to be measured is selected and the rod head of the selected electrode is connected to the power lead of a DC power source set to a given output current correlated with the type of electrode. A root bead is laid in the gap from an upper start position on said workpiece by progressively filing the gap and then discontinuing the root bead welding at a lower end position when a given length of the electrode has been consumed; and, measuring the distance between the upper start position and the lower end position with the run out distance being indicative of a quality characteristic of the electrode. This method can be used to measure the run out per time instead of run out per electrode consumed length.

24 Claims, 5 Drawing Sheets

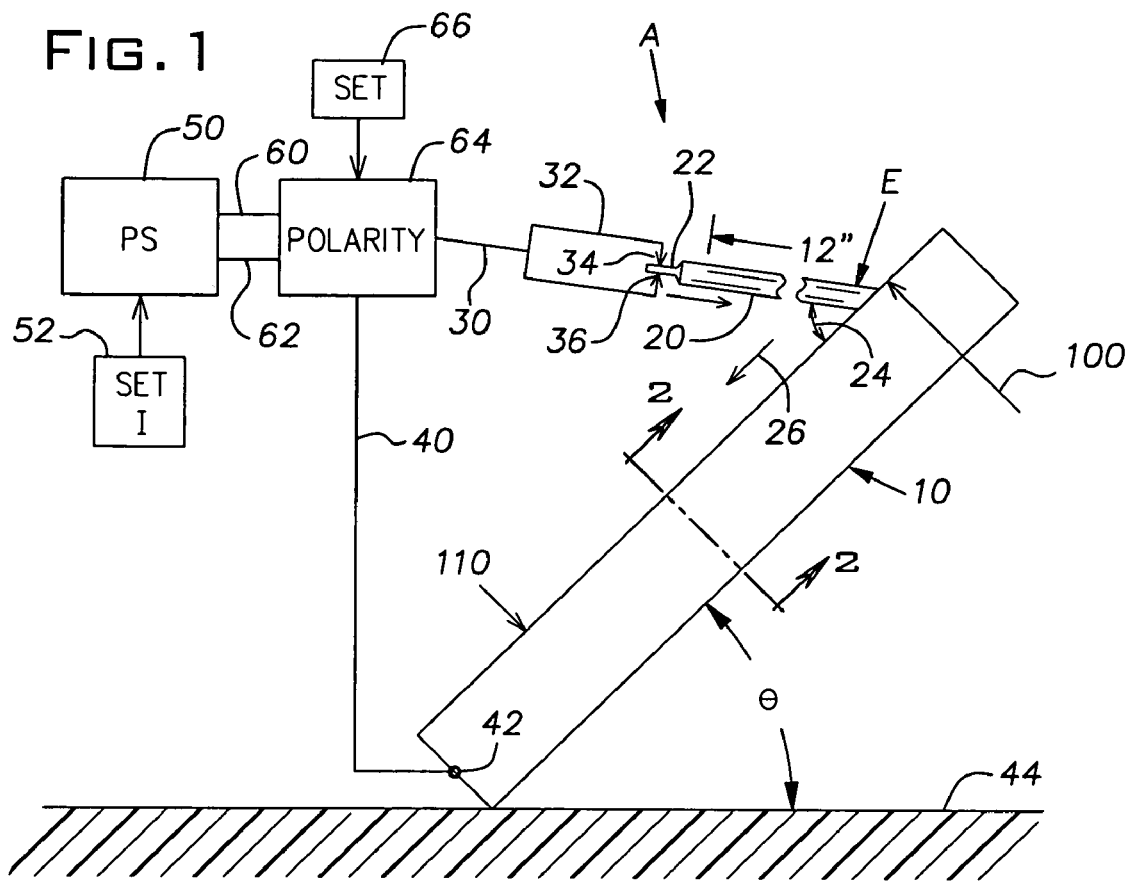
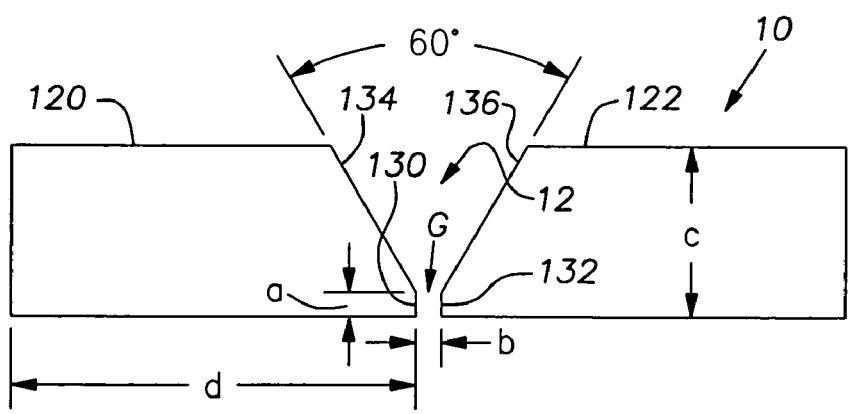

DETERMINING QUALITY OF A STICK ELECTRODE

This invention relates to a stick electrode developed for pipe welding and more particularly to a method of determining the quality of a stick electrode for use in laying the root pass or bead in the bottom of a pipe joint.

BACKGROUND OF INVENTION

In laying pipe lines, long sections of pipe are joined together at spaced circular joints having a defined cross-sectional profile with an interior portion defining a small gap with a width and height of approximately $1/16$ inch which is about 1.5 to 2.0 mm. To join the next section to the pipe line, the gap in the joint is first filled by a molten metal using an electric arc welding process. The joining together of the pipe sections at the gap is achieved by laying a molten bead in the gap. This procedure melts the metal defining the gap and combines it with the melted metal of an advancing electrode, as the electrode is moved circumferentially around the joint. This process is referred to as the root pass. After the root pass or bead is laid to fill the gap of the adjacent pipe sections completely around the circumference of the joint, the rest of the joint is filled by several successive molten metal beads. An important aspect of a pipe welding process is the laying of the root pass or bead by a stick electrode moving circumferentially downwardly from the top to the bottom of the pipe on both sides of the cylindrical pipe sections. A stick electrode developed for the root pass has a length of about 14 inches and is consumed as the root pass progressively joins the two sections of pipe. After about 12 inches of stick electrode has been consumed, the welder must load another stick electrode in the electrode holder, start the power supply and continue progression around the circumference of the pipe joint. When the electrode has been consumed, the time and labor required to start the next electrode is substantial; therefore, it is desirable to weld the two pipe sections together using a minimum number of electrodes. This can be accomplished by a stick electrode which joins the spaced gap between the sections over a greater run out distance for consumption of the single electrode. Thus, a stick electrode having greater run out during root pass welding is desirable. The greater run out of an electrode decreases the number of electrodes used for the root pass welding.

Manufacturers of stick electrodes developed for the root pass welding formulate the electrode and extruded covering on the electrode to maximize the run out distance. Run out is determined by the chemical and physical characteristics of the stick electrode and can be effected by such characteristics as arc force, wetting of the weld bead, surface tension of the weld bead, slag interference to name a few. Manufacturers tend to claim that its stick electrode designed for the root pass welding has a superior run out. However, undocumented claims of high run out are not helpful to a pipe welder when judging the quality and advisability of selecting particular types of stick electrodes for root pass welding available from diverse manufacturers. There is no repeatable procedure to evaluate the run out of a stick electrode for root pass welding so that the run out can be compared to the cost of the electrode for economical selection of a particular stick electrode. This is the dilemma to which the present invention is directed.

THE INVENTION

To measure or determine the quality of a particular type of stick electrode used in forming the root bead or pass of a pipe welding joint, there is provided a standardized procedure to obtain a run out value for the stick electrode. The run out value can be the run out for a given length of electrode consumed or run out for a given time, normalized to a set time. This run out value is compared to the run out value of other stick electrodes to provide a comparison of electrode effectiveness or overall quality.

In accordance with the invention, there is provided a method of measuring the merit of stick electrode used in forming the root bead or pass of a pipe joint. The electrode has a wire diameter, a length substantially greater than 12 inches and an upper exposed rod head. The method involves a standardized workpiece including two spaced plates with a groove between the plates. The groove has a set profile with a lower gap duplicating the root gap of a pipe joint. The set profile, in the preferred embodiment is the specific example published in API 1104 from the American Petroleum Institute. In that document configuration the gap has a width and height of about $1/16$ inch or 1.5-2.0 mm. The diverging sidewalls of the groove have an included angle of 60°. This fixed profile is used in the preferred embodiment of the present invention. Each of the spaced plates has a minimum width of 2.0 inches and a thickness of at least $1/4$ inch. In practice the thickness is about $1/2$ inch. The method further involves mounting the standardized workpiece on an incline with the groove facing upward wherein the incline has a fixed, known angle. In practice this angle is 45°. The angle can be as steep as 90°, but is preferably in the range of 40-50°. A stick electrode of the type to be measured is then selected and connected by the rod head to a power lead of a DC power source, which power source is set to a given output current correlated with the type of electrode. Downward progressing welding along the groove is used to lay progressively a root bead filling the gap of the groove. Welding starts at an upper position on the workpiece. The downward progressing welding closes the gap by using the given output current from the power source to melt the electrode and nose sections defining the gap. The downward progressing welding is discontinued at a lower position when a given length of electrode has been consumed. In practice this given length is 12 inches. Then, the distance between the upper start position and the lower end position is measured to provide a run out distance indicating a quality characteristic of the stick electrode. The test can be terminated when the electrode sticks to the workpiece or burns through the gap. In a more practical implementation, the run out obtained for a given time is determined. This is normalized by being the quotient of the run out over welding time.

The melting of the electrode and workpiece is done with a DC positive current or a DC negative current. When the wire diameter is about $1/8$ inch, the output current is in the range of 80-110 amperes. When the wire diameter is about $5/32$ inch the output current is in the range of 100-140 amperes. To reduce the skill needed for progressively filling the gap, lower current levels in the stated range are employed. Lower current increased the time to consume the electrode.

The method of the present invention is primarily employed to obtain a standardized run out level or value or the run out per weld time for a specific stick electrode used in a root pass or root bead process on a pipe joint; however, the method is also used to compare the run out distance of different electrodes, either of different types or from different sources or manufacturers.

The primary object of the present invention is the provision of a standardized method for providing a repeatable value or number of a stick electrode specifically designed for the root pass or bead welding of pipe joint.

Another object of the present invention is the provision of a method, as defined above, which method allows a customer to compare the quality of different stick electrodes for the root pass of a pipe welding operation.

Still a further object of the present invention is the provision of a method, as defined above, which method is easily performed and provides accurate information indicative of a quality characteristic of a stick electrode.

These and other objects and advantages will become apparent from the following description taken together with the accompanying drawings.

BRIEF DESCRIPTION OF DRAWINGS

FIG. 1 is a schematic block diagram and partial side elevational view of an apparatus and workpiece used in performing the preferred embodiment of the present invention;

FIG. 2 is an enlarged cross-sectional view taken generally along line 2-2 of FIG. 1;

FIG. 9 is a flow chart as shown in FIG. 6 for operation of the embodiment as illustrated in FIG. 8.

PREFERRED EMBODIMENT

Figure 6:
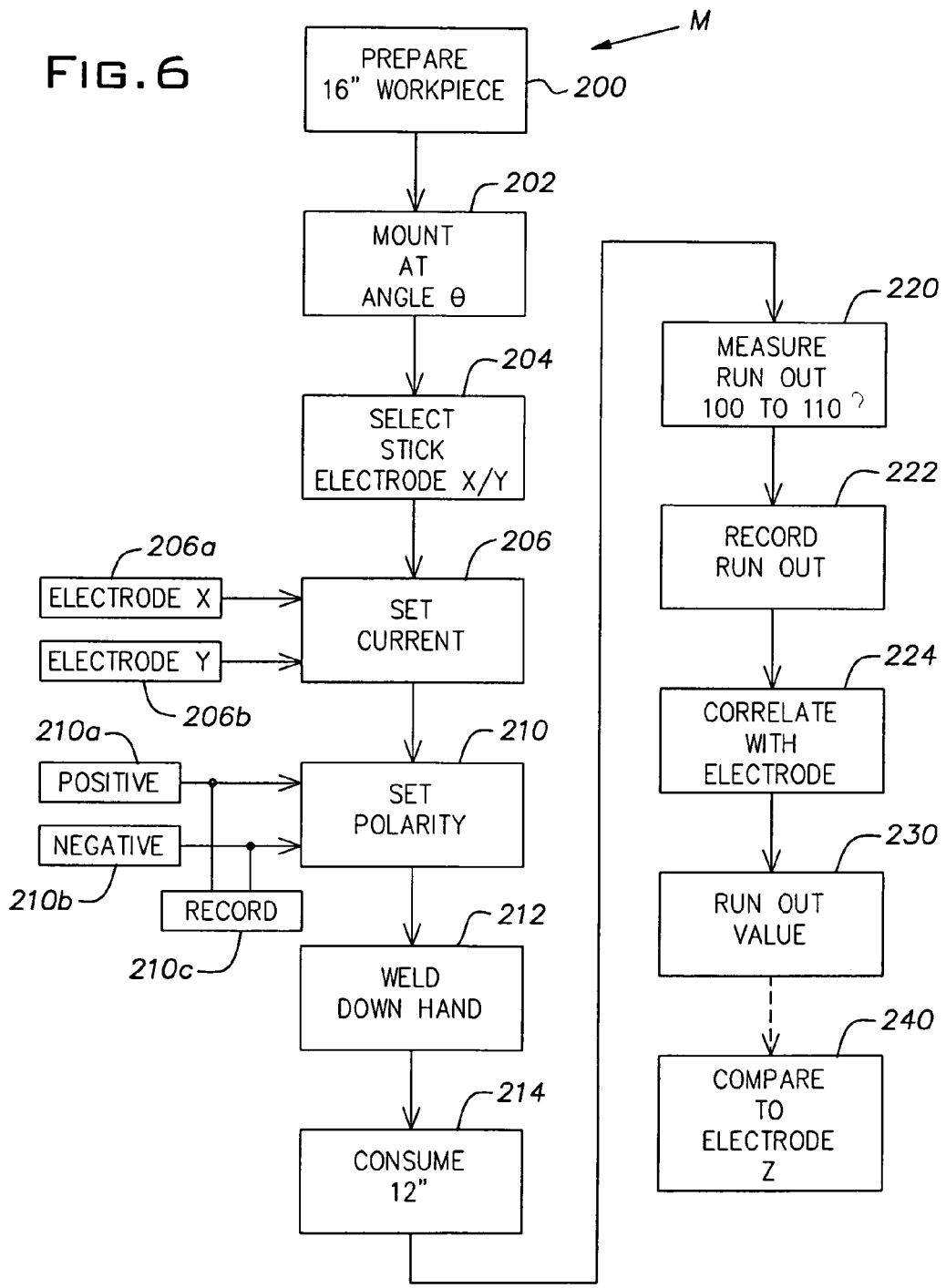
FIG. 6 is a flow chart of the preferred embodiment of the present invention.

The embodiment of the inventive method disclosed in FIG. 6 is performed by an apparatus or system generally illustrated in FIGS. 1 and 2. In system A, workpiece 10 is provided with groove 12 extending along its length to receive electrode E to be evaluated. Electrode E includes extruded outer coating 20 and upper rod head 22 for electrical connection. During welding to fill the gap G in groove 12, electrode E is oriented with workpiece 10 at an angle, shown as angle 24. Movement of electrode E in the direction of arrow 26 provides downward progressing welding by electrode E in a root pass. Since groove 12, as shown in FIG. 2, duplicates the groove between two sections of pipe, the diameter of the metal rod of electrode E is generally 1/8 inch or 5/32 inch. The total length of the electrode is normally at least 14 inches and the given length to be consumed during the downward progressing welding process is 12 inches, as indicated on FIG. 1. The set given length of the test can be a length different than 12 inches. Gap G, as shown in FIG. 2, duplicates the gap between the ends of two adjacent pipe sections and is filled by the downward progressing welding of electrode E. To provide the welding current, power lead 30 is connected by way of electrode holder 32 and clamps 34, 36 so current in lead 30 is directed to top rod head 22 of electrode E for performing the welding operation to progressively fill gap G. The electrical circuit is completed by ground lead 40, attached by connector 42 to workpiece 10 positioned onto non-conductive support base 44 at an inclined angle θ, which angle is between 40-50° and is preferably 45°.

Power source 50 is adjusted to have a set output current, as represented by block 52. The current is in the general range of 80-100 amperes when electrode E has a center rod of approximately 1/8 inch. When the rod is enlarged to about 5/32 inch, the adjusted or set welding current is in the general range of 100-140 amperes. Lower currents provide slower welding, but require less skill in filling gap G. Power source 50 has output leads 60, 62 directed to polarity switch 64, illustrated as being shifted between a positive polarity and a negative polarity by block 66 so that the polarity between leads 30, 40 is either DC positive or DC negative. The welding operation to fill gap G by movement of electrode E in direction 26 is initiated at start position 100. As the electrode E is consumed to a given length, such as 12 inches, the filled portion of the gap, or the run out, progresses to lower position 110. Thus, the run out during the downward progressing root pass welding continues until it consumes 12 inches of the electrode. The run out has a length measured between position 100 and position 110. This measurement is the run out for electrode E. It is determinative of the quality or characteristic of an electrode designed specifically for root pass welding. When 12 inches of the electrode has been consumed, gap G is filled between positions 100 and 110. Thus, this distance is a run out measurement for electrode E as determined by the standardized test of the present invention.

System A is used to perform the welding operation on gap G on groove 12. The gap is part of a fixed standardized profile, which profile in practice is designed to meet the API 1104 configuration, as illustrated in FIG. 2. This configuration is provided by spaced metal plates 120, 122 formed of metal like the pipe to be welded with electrode E. These plates are spaced to define gap G having lower inwardly facing noses 130, 132 so the gap has a length a and a width b. In the standardized profile, the height and width are approximately 1/16 inch or 1.5-2.0 mm. Each plate has a thickness c which is at least 1/4 inch and preferably at least 3/8 inch. Groove 12 is in the form of a wedge having diverging walls 134, 136 forming an included angle of 60°. To assure that there is sufficient metal around gap G, metal plates 120, 122 have a width d which width is at least 2 inches and preferably about 3 inches. Sidewalls 134, 136 extend upwardly from noses 130, 132, respectively, to define wedge shaped groove 12 for the root pass welding operation of gap G in a manner duplicating root pass welding of a pipe joint in the field. Welding by electrode E has a travel speed determined by the set current and a run out distance determined by the physical characteristic of electrode E, irrespective of the current used in the welding operation. Thus, the distance between the start of the welding operation at position 100 and the end of the welding operation at position 110 is controlled by consumption of 12 inches of electrode, or another set standard test length, during the root pass welding operation at polarity determined by the setting indicated at block 66.

Figure 3:
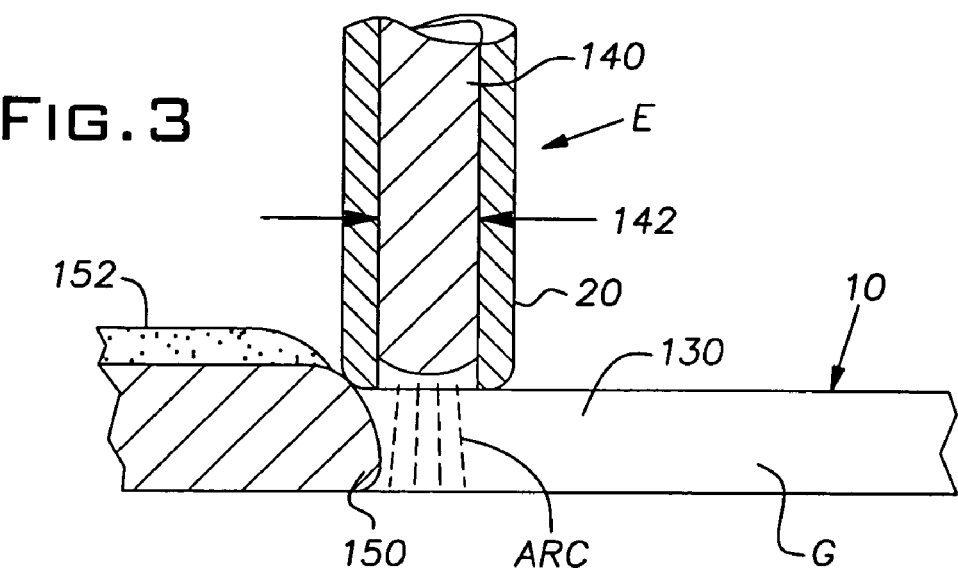
FIG. 3 is a side elevational view of an electrode as it performs a root pass weld in a pipe joint.
Figure 4:
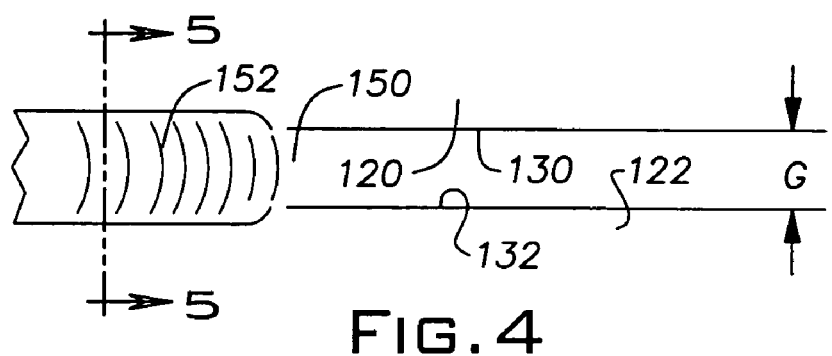
FIG. 4 is a schematic view taken generally from the top of the groove as shown in FIG. 3.
Figure 5:
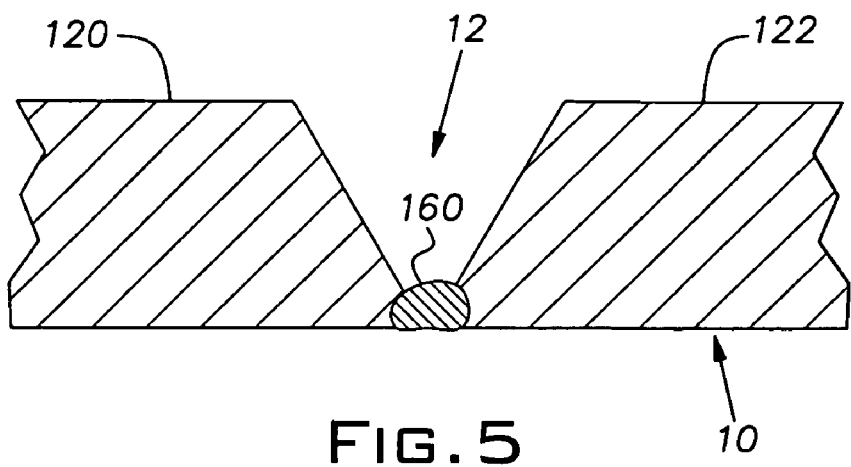
FIG. 5 is a cross-sectional view taken generally along line 5-5 of FIG. 4.

A representation of the welding process employed to produce the root bead or pass is schematically illustrated in FIGS. 3-5. Electrode E has center metal rod 140 with a diameter 142. For root pass welding, the diameter is customarily either about 1/8 inch or about 5/32 inch, or the metric equivalents thereof. Arc ARC melts both the advancing end of rod 140 and the spaced noses 130, 132 to form a molten metal pool 150 covered by slag 152. This procedure produces root bead 160 formed by molten metal from rod 140 and forms melting of a certain portion of the spaced noses 130, 132. Bead 160 is formed as electrode E progresses downward from position 110. The speed of the travel is controlled by the need to form bead 160 during the welding process. Thus, the welding time is determined by the current and the speed of travel. Travel speed is controlled by forming root bead 160. Consequently, a longer time is required as the current is decreased within the operative range, so far described. Lower currents require less skill in laying bead 160. After the bead had been laid while a given length of electrode is consumed, the end position 110 is determined. This position provides an indication of run out for the electrode being tested or measured. This value can be normalized by testing more than one of the same type electrode.

The standardized method measures the quality of stick electrode E by determining relative run out. This is accomplished by forming the root bead of a pipe joint using system A as shown in FIG. 1. Standardized method M involves the procedures already described. These procedures are expanded and explained using the flow chart of FIG. 6. As a first act, workpiece 10 is prepared with a length of over 16 inches in the preferred implementation. The length should be at least this long, since good run out distances generally approach 16 inches. After the workpiece has been prepared, it is mounted on insulation base 44 at an incline angle θ, which angle in practice is 45°. In some instances θ may be 90°. The preferred angle is 40°-50°. Then, the stick electrode to be evaluated or measured is selected. The electrode is either electrode X having a rod diameter of approximately ⅛ inch or electrode Y having rod diameter of approximately 5/32 inch. Of course the metric equivalents of these electrodes would also be used as electrode X or electrode Y. Then, power source 50 has a fixed current set by block 52, which current is consistently used for performing method M. If the electrode is electrode X, box 206a is used to fix the current. This current level is a fixed level within the range of 80-110 amperes. In a like manner, if the electrode being tested is an electrode Y, block 206b sets a fixed current used in all successive tests. This fixed current is in the range of 100-140 amperes. The currents standardize method M. Thus, when an electrode X is selected at block or step 204, the current is set by block 206a. When a larger electrode is selected for testing, a higher current is set by box 206b. After setting the current, the polarity of the current is set to be either positive by block 210a or negative by block 210b. Electrodes marketed in different parts of the world use either positive current or negative current. Thus, the electrode X or the electrode Y can be tested either with positive polarity current or negative polarity current. The polarity of the current is recorded as indicated by block 210c so that the end result will be run out distance for a given polarity. This constitutes the standardized test of method M.

After the current has been set and the polarity recorded or indicated, the electrode is used to weld downward progressing along gap G in groove 12. This welding process is used to lay bead 160 between noses 130, 132 until a set length of electrode is consumed. In practice, this fixed amount or length is 12 inches as indicated by block 214. After the given electrode amount has been consumed, bead 160 is stopped to determine the end position 110. Then, the distance between position 100 and the position 110 is measured to give the run out distance, as indicated by block 220. This distance is recorded as the run out value or level as indicated by block 222 and is combined with the identity of the current polarity, as provided by block 210c. Thus, the recorded run out distance is a value for a given electrode at a given polarity. This information is correlated with the tested electrode, as indicated by block 224. Thus, the method provides a run out value or distance in block 230. This value can then be published and accompany all electrodes of the type measured by method M. A customer can be assured that standardized method M guarantees the electrodes of the tested group or type have a specific run out distance for a given polarity. A known quality factor for the electrode type tested is provided. The set current need not be known, since it is a fixed value for standardized method M. The run out value for a given polarity is compared to the same tested run out value for electrode E. The difference is determined and available or recorded as indicated by block 240. This allows quality comparisons of stick electrodes.

By using method M with the schematically illustrated system A shown in FIG. 1, any type of electrode can have a quality determinative number indicated as the run out amount or distance obtained by using a standard repeatable method. In this manner, any type of electrode can be compared with other types of electrodes, either from the same manufacturer or from different manufacturers. Consequently, a customer ordering a stick electrode for the root pass of a pipe welding operation can be assured that the best electrode for the cost is obtained. Various changes can be made in the fixed parameters of method M so long as the method is standardized with a fixed set of parameters, so that each run out value or distance is under controlled conditions. The test can be standardized by time.

In conducting the standard test of the invention, a mark is made at a given length on the electrodes to be tested. Then these electrodes are welded to the mark. Since the same length of each electrode is consumed with a standard current, the weld time required for the weld is fixed. This provides a run out distance for the electrodes.

Figure 7:
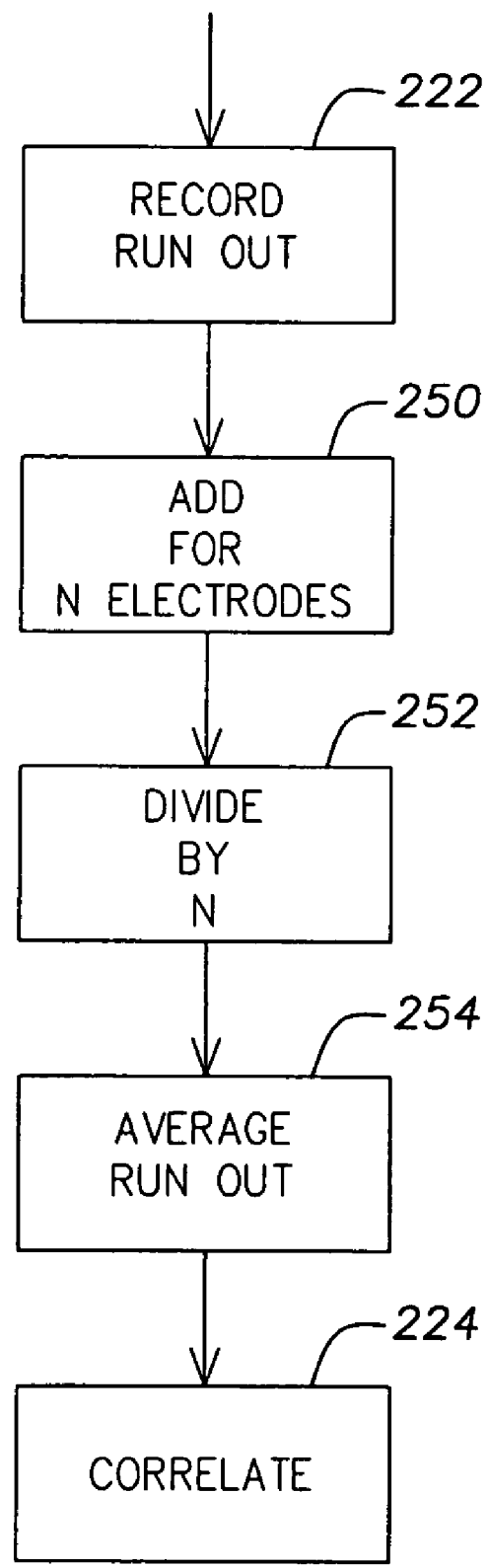
FIG. 7 is a partial flow chart showing the averaging program used with the present invention.

The run out distance for a given length of consumed electrode can be normalized. One concept to average several tested electrodes is shown in FIG. 7. After the run out is measured by block 222, the value is added to other electrodes as shown by block 250. The number of electrodes tested is illustrated as N. The totalized run out for N electrodes is divided by N as represented by block 252. This develops an average run out for the tested electrodes as represented by block 254. This data is inputted into block 224 of the flow chart in FIG. 6 for processing as so far described.

Figure 8:
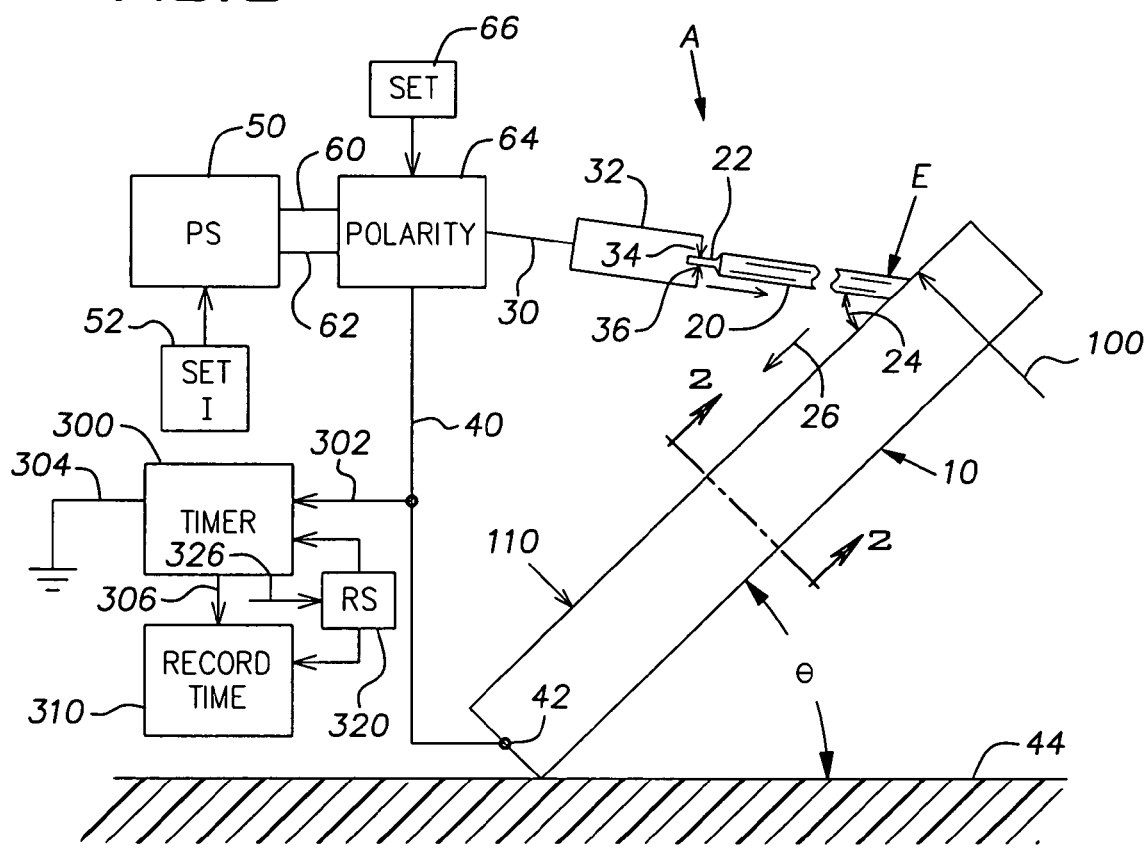
FIG. 8 is a schematic block diagram as shown in FIG. 1 describing another embodiment of the invention.

In another implementation of the invention, the results are normalized by the time of welding. The method described in FIGS. 1 and 2 is modified to measure the weld cycle for the test using the method illustrated schematically in FIG. 8. Timer 300 has a power input 302 and ground 304 SO it starts timing when a welding cycle begins. The accumulated time indicating the weld time of the test is outputted on line 306 to time recorder 310. The recorded time and the run out length between points 100 and 110 are used to determine the relative quality of the electrodes being measured in accordance with the method This method is essentially the same as the method illustrated in FIG. 6 to block 212. The time of recorder 310 is the determined weld time This weld time is used to divide the measure run out The resulting data is the run out per time. This is normalized to one minute and is correlated to the tested electrode by parameters, such as diameter, manufacturer and classification. This provides a value. As shown in FIG. 7, this value can be the average of several electrodes tested. The result is normalized by time and averaged. The value of one type of electrode can be compared to other electrodes, differing in parameters and especially the parameter of the manufacturer.

Having thus defined the invention, the following is claimed:

1. A method of measuring the quality of a type of stick electrode used in forming the root bead of a pipe joint, said electrode having a wire diameter, a length substantially greater than 12 inches and an upper exposed rod at the holder end, said method comprising:
   (a) preparing a standardized workpiece including two spaced plates with a groove between the plates having a set profile including a lower gap duplicating the root gap of said pipe joint;
   (b) mounting said standardized workpiece on an incline with said groove facing upwardly, said incline being at a fixed known angle;
   (c) selecting a stick electrode of the type to be measured;
   (d) connecting said rod head of said selected electrode to the power lead of a DC power source;
   (e) setting said power source to a given output current correlated with said type of electrode;
   (f) downward progressing welding along said groove to lay a root bead in said gap of said groove from an upper start position on said workpiece by progressively filing said gap;
   (g) discontinuing said root bead welding at a lower end position when a given length of said electrode has been consumed; and,
   (h) measuring the distance between said upper start position and said lower end position, said run out distance being indicative of a quality characteristic of a stick electrode.

2. A method as defined in claim 1 wherein said given output current is DC+current.

3. A method as defined in claim 1 wherein said given output current is DC−current.

4. A method as defined in claim 1 wherein said wire diameter is about ⅛ inch and said given output current is in the range of 80-110 amperes.

5. A method as defined in claim 1 wherein said wire diameter is about 5/32 inch and said given output current is in the range of 100-140 amperes.

6. A method as defined in claim 1 wherein said gap is about 1/16 inch wide and 1/16 inch high.

7. A method as defined in claim 1 wherein said plates have a width of at least 2.0 inches.

8. A method as defined in claim 1 wherein said given consumed length is about 12 inches.

9. A method as defined in claim 1 wherein said fixed known angles is in the range of 40-50°.

10. A method as defined in claim 9 wherein said fixed known angle is about 45°.

11. A method as defined in claim 1 including:
    (i) comparing said measured run out distance with the likewise measured run out distance of a different electrode.

12. A method as defined in claim 11 wherein said different electrode is of the same type but from a different source.

13. A method as defined in claim 1 including:
    (i) obtaining said measured run out distance from a set number of said type of electrodes; and,
    (j) averaging said run out distances to obtain a quality value.

14. A method as defined in claim 1 wherein said profile is a configuration published in the API 1104 specification.

15. A method of measuring the quality of a type of stick electrode used in forming the root bead of a pipe joint, said electrode having a wire diameter, a length substantially greater than 12 inches and an upper exposed rod head, said method comprising:
    (a) preparing a standardized workpiece including two spaced plates with a groove between the plates having a set profile including a lower gap duplicating the root gap of said pipe joint;
    (b) mounting said standardized workpiece on an incline with said groove facing upwardly, said incline being at a fixed known angle;
    (c) selecting a stick electrode of the type to be measured;
    (d) connecting said rod head of said selected electrode to the power lead of a DC power source;
    (e) setting said power source to a given output current correlated with said type of electrode;
    (f) downward progressing welding along said groove to lay a root bead in said gap of said groove from an upper start position on said workpiece by progressively filing said gap;
    (g) discontinuing said root bead welding at a lower end position to provide a weld cycle;
    (h) measuring the time of said weld cycle;
    (i) measuring the distance between said upper start position and said lower end position; and,
    (j) dividing said run out distance by said measured time to obtain a value indicative of a quality characteristic of a stick electrode.

16. A method as defined in claim 15 wherein said given output current is DC+current.

17. A method as defined in claim 15 wherein said given output current is DC−current.

18. A method as defined in claim 15 wherein said wire diameter is about ⅛ inch and said given output current is in the range of 80-110 amperes.

19. A method as defined in claim 15 wherein said wire diameter is about 5/32 inch and said given output current is in the range of 100-140 amperes.

20. A method as defined in claim 15 wherein said gap is about 1/16 inch wide and 1/16 inch high.

21. A method as defined in claim 15 wherein said time is about 1.0 minute.

22. A method as defined in claim 15 including:
    (k) comparing said measured distance/time value with the likewise measured value distance of a different electrode.

23. A method as defined in claim 22 wherein said different electrode is of the same type but from a different source.

24. A method as defined in claim 15 including:
    (k) obtaining said measured distance/time value from a set number of said type of electrodes; and,
    (l) averaging said values to obtain a quality value.

* * * * *

UNITED STATES PATENT AND TRADEMARK OFFICE
CERTIFICATE OF CORRECTION

PATENT NO. : 7,307,238 B2  Page 1 of 1
APPLICATION NO. : 11/357863
DATED : December 11, 2007
INVENTOR(S) : Randall M. Burt et al.

It is certified that error appears in the above-identified patent and that said Letters Patent is hereby corrected as shown below:

In the Specification, please delete the paragraph at column 3, lines 39 and 40.

Signed and Sealed this

Fifteenth Day of April, 2008

JON W. DUDAS
*Director of the United States Patent and Trademark Office*